UNITED STATES PATENT OFFICE.

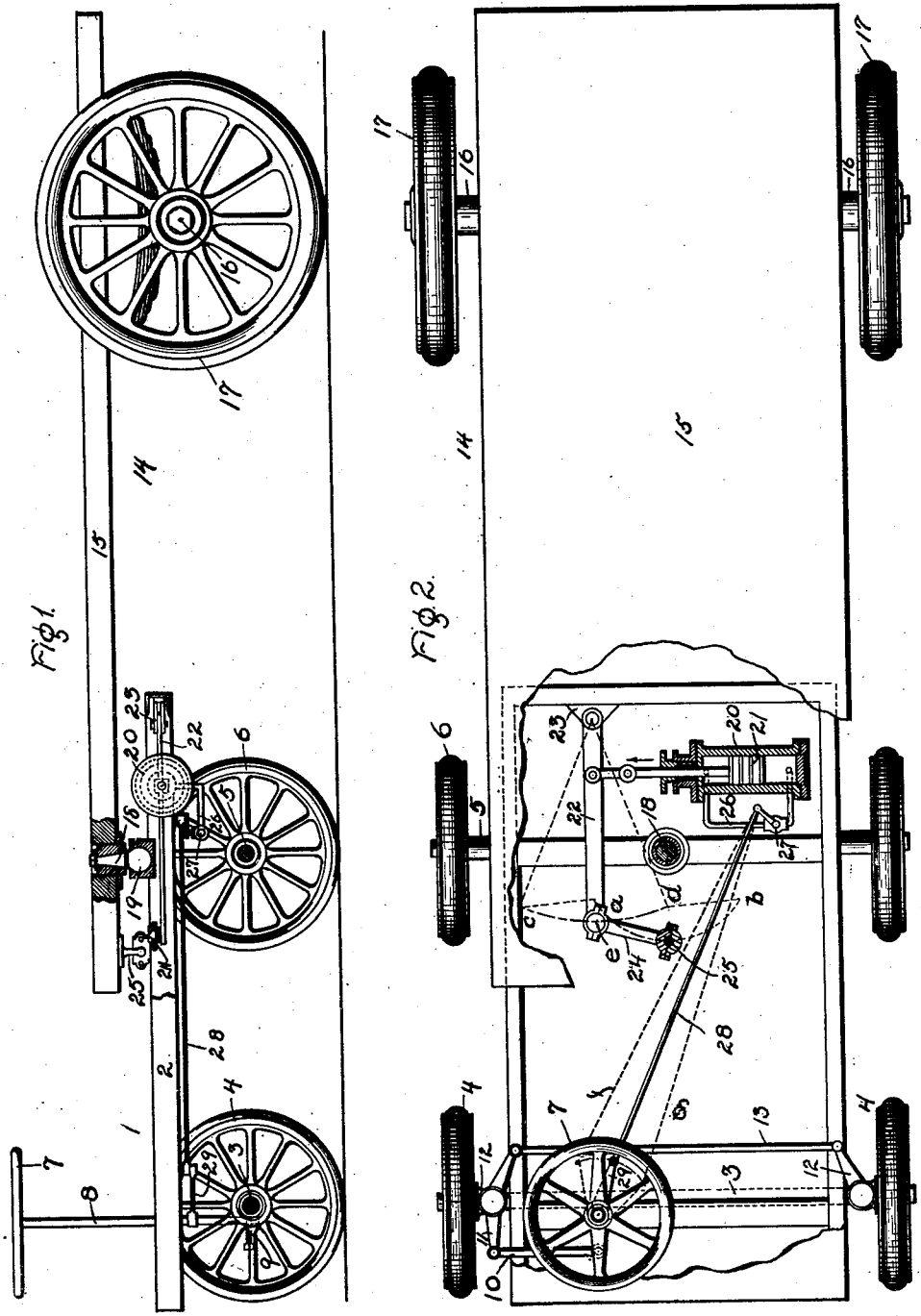

ARTHUR PRZYGODE, OF CHARLOTTENBURG, GERMANY, ASSIGNOR TO GENERAL ELECTRIC COMPANY, A CORPORATION OF NEW YORK.

MOTOR-VEHICLE.

No. 903,884.

Specification of Letters Patent. Patented Nov. 17, 1908.

Application filed October 13, 1905. Serial No. 282,539.

*To all whom it may concern:*

Be it known that I, ARTHUR PRZYGODE, a subject of the King of Prussia, residing at Charlottenburg, Germany, have invented certain new and useful Improvements in Motor-Vehicles, of which the following is a specification.

The present invention relates to motor vehicles of that class employing a fore-car which carries the power system, and a trailer or rear-car which may be a bus or a truck. The trailer or rear-car, usually having two road wheels which are located at the rear, is pivotally supported at its front end on the rear portion of the fore-car by means of a king-bolt, the whole making a six-wheeled vehicle with the fore car functioning as the steering element. In the practical operation of these vehicles, trouble is experienced in steering, especially when traveling at high speeds. This is due to the momentum of the rear-car, by virtue of which the car tends to continue in a straight-ahead course and fails to follow immediately any change in direction of travel of the fore-car whenever the latter is steered or turned into a new course. As a result, the trailer which is generally considerably heavier than the fore-car, causes the rear wheels of the latter to skid badly at times and turns the fore-car to a greater extent than is intended by the driver. Obviously this skidding is not only injurious to the tires, but may result in other damage.

The object of my invention is to overcome these difficulties by providing a checking device which tends to resist any change in the relative position of the cars at all times; more particularly, however, during the steering operation. This motion-checking device is preferably of a hydraulic type and comprises a cylinder mounted on one of the cars and a piston that is connected with the other car so as to move in the cylinder during any change in angular relation between the longitudinal axes of the two cars about the king-bolt or pivotal point between them. During movement of the piston, fluid is forced out of the cylinder through a throttled passage which offers a resistance to the flow. The work overcome in doing this considerably reduces the freedom of movement of the rear-car about the king bolt and dampens the effect of the momentum of the trailer which otherwise tends to produce skidding. The throttled passage preferably takes the form of a by-pass extending from one cylinder head to the other. The throttle may be a simple valve or otherwise, providing a variable or constant resistance, as desired.

For an understanding of the invention more in detail, attention is directed to the following description taken with the accompanying drawings, and to the features of novelty set forth in the claims appended hereto.

In the accompanying drawings which illustrate one embodiment of the invention, Figure 1 is a side view of a vehicle of the character described with the motion-checking device applied thereto; and Fig. 2 is a plan view thereof with portions broken away to more clearly show the location and arrangement of the parts.

Referring to the drawings, 1 represents a fore-car having a spring supported body or frame 2 which is adapted to carry the power or driving apparatus; the latter and the springs for supporting the body being omitted in Fig. 1 for the sake of clearness of illustration. The frame is mounted by means of its springs upon the axle 3 carrying the front or steering wheels 4 and the axle 5 carrying the rear of driving wheels 6. The steering mechanism comprises a hand wheel 7 or equivalent device arranged on a column or post 8, an arm 9 at the lower end of the latter, and a link 10 which connects the arm 9 with a lever 11 of the steering knuckle 12 of the right hand wheel. The steering knuckles of both wheels are connected to produce united action by the drag-link 13. The power apparatus is adapted to be arranged at the rear or other portion of the car as usual. The fore-car is thus a complete self-contained motor-driven vehicle.

The rear car or trailer 14 comprises a spring-supported body 15 mounted at its rear end upon a spring-carrying axle 16 supported by the rear wheels 17. At its front end the body is pivotally supported on the rear of the fore-car by a centrally located king-bolt 18 which includes a ball-and-socket joint 19 whereby relative movement between the cars in all directions is permitted so as to provide for varying conditions of road surface and load. The trailer body has thus a three-point suspension.

The motion-checking device comprises a cylinder 20 suitably supported on the frame of the fore-car and in which moves a piston 21. The piston rod is linked to a lever 22, of the second order, fulcrumed at one side of the king-bolt on a bracket 23 secured to the rear portion of the fore-car. The front end of the lever which extends to a point forward the king-bolt is connected by a link 24 to a pivot 25 depending from the front portion of the trailer body, Fig. 1, and normally occupying a point directly in front of the king-bolt. The connection between the pivot and link is preferably of a ball-and-socket joint so as to provide the necessary freedom of motion. By this arrangement of the parts, when the fore-car is steered to the left the pivot 25, Fig. 2, moves around the king-bolt on the arc $a\,b$ to or approaching the extreme point $a$. By this movement the front of the lever 22 moves on the arc $c\,d$ from the point $e$ to or approaching $c$. This moves the piston to the right. When the car is steered to the right, the pivot 25 moves toward $b$ and the point $e$ toward $d$, hence moving the piston to the left.

The cylinder is filled with a hydraulic fluid such as oil, glycerin or other fluid, preferably non-freezing. Connecting the outward ends of the cylinder is a by-pass 26 in which is located a throttle or other resistance device 27 moved by the steering wheel, whereby the flow of fluid through the by-pass can be resisted to any desired extent. When the piston is moved, due to the steering of the fore-car to one side or the other, fluid is displaced from the right hand or the left hand side of the piston and caused to flow through the by-pass to the opposite side thereof, the work required to be done being determined by the set of the throttle or resistance device 27. During operation the pivot 25 changes from a position directly in front of the king-bolt only when the fore-car is steered to the right or left. The movement of the pivot carries the piston in one direction or the other, overcoming the resistance offered by the throttle to the passage of the displaced fluid through the by-pass. Thus the rear-car in turning about the king-bolt has to perform the work of overcoming a resistance due to the motion-checking device.

The parts of the check are so proportioned and set that the effect of the momentum developed by the trailer will be practically absorbed by the checking device before skidding can occur. The result is that during steering, the trailer readily follows the fore-car into its new course. From this it will be seen that the motion-checking device assists in the steering of the vehicle as a whole.

The throttle 27 may be set once for all so as to offer a constant resistance, or as shown, it may be connected with the steering column by means of a drag-link 28 connected with an arm 29 extending rearwardly from the lower end of the column so that the resistance can be varied directly as the angle of steering. As shown in Fig. 2, the parts are in mid-position, corresponding to a straight-ahead travel of the vehicle, the throttle being in full-open position. By turning the hand wheel of the steering mechanism to one side or the other, the drag-link 28 moves to a greater or less extent toward either of the extreme positions indicated by dotted lines $f\,g$. During this movement, the throttle valve is closed to a corresponding degree so that the greater the angle of steering the greater will be the resistance offered to the flow-out fluid through the by-pass. The object of this will be readily seen upon considering an instance where it is attempted to make a quick and abrupt turn while traveling at a high speed, at which time the momentum of the trailer will tend to produce a maximum skidding effect. But as the throttle closes to a greater degree when an abrupt turn is made, the work required to be done in overcoming the resistance of the motion-checking device must be proportionally great. The converse of this is true when slight turns are made.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. A motor vehicle comprising a fore car, a rear car, a pivotal connection between the cars, and a device having an attachment to each car which checks the angular movement of one car with respect to the other.

2. In a motor vehicle, a fore car, a rear car, a pivotal connection between the cars, means having an attachment to each car, and a retarding device acting on said means to check the angular movement of one car with respect to the other.

3. A motor vehicle comprising a fore car, a trailer, a king-bolt pivotally connecting the trailer and the car and about which, as an axis, the trailer may swing, and mechanism on one of the cars for steering the vehicle, in combination with means for checking the relative angular movement of the car and trailer about the bolt when steering.

4. A self-propelled vehicle comprising a fore-car, a trailer pivotally connected therewith, and a steering mechanism on the fore-car for guiding the vehicle, in combination with a device arranged and adapted to reduce the tendency of the trailer to cause skidding of the fore-car during steering by absorbing the momentum of the trailer and thus dampening the effect of said momentum on the fore-car.

5. A self-propelled vehicle comprising a fore-car, a trailer supported at one end by the car, a pivotal connection between the car and the trailer, and mechanism on one of the cars for steering the vehicle, in combination with a device which checks excessive freedom of movement between the car and trailer around the pivotal connection during the act of steering.

6. A self-propelled vehicle comprising a fore and a rear car having their adjacent ends arranged in overlapping relation, and a single pivotal connection between the ends, in combination with a device arranged and adapted to yieldingly resist relative angular movement between the cars.

7. A self-propelled vehicle comprising a fore car, a rear car, a universal pivotal connection between the cars, and a steering mechanism on one of the cars, in combination with a device arranged between the cars for decreasing the momentum effect of one car on the other.

8. A self-propelled vehicle comprising a fore and a rear car, a pivotal connection between them, and a steering mechanism on the fore-car for steering the vehicle, in combination with a hydraulic motion-checking device arranged between the cars for preventing skidding of the fore-car.

9. A self-propelled vehicle comprising a fore and a rear car, a pivotal connection between them, and a steering mechanism on the fore-car for steering the vehicle, in combination with a hydraulic motion-checking device arranged between the cars for preventing skidding of the fore-car, and means for adjusting the checking device.

10. A self-propelled vehicle comprising a fore and a rear car, a pivotal connection between them, and a steering mechanism on the fore-car for steering the vehicle, in combination with a hydraulic motion-checking device arranged between the cars for preventing skidding of the fore-car, means for adjusting the resistance offered by the motion-checking device, and a connection between the steering mechanism and the said means whereby the latter is controlled by the mechanism.

11. A self-propelled vehicle comprising a fore and a rear car, a pivotal connection between them, and a steering mechanism on the fore-car for steering the vehicle, in combination with a motion-checking device for preventing skidding of the fore-car due to the action of the rear-car which comprises a fluid-containing cylinder located on one of the cars, a piston therein connected with the other car, a by-pass connecting opposite ends of the cylinder, and a means for regulating the flow to the by-pass during relative movement of the piston and cylinder.

12. A self-propelled vehicle comprising a fore and a rear car, a pivotal connection between them, and a steering mechanism on the fore-car for steering the vehicle, in combination with a motion-checking device for preventing skidding of the fore-car which comprises a fluid-containing cylinder located on one of the cars, a piston therein connected with the other car, a by-pass connecting opposite ends of the cylinder, means for regulating the flow through the by-pass during relative movement of the piston and cylinder, and a connection between the said means and the steering mechanism whereby the former is adjusted simultaneously with the steering of the vehicle.

13. A self-propelled vehicle comprising a fore and a rear car, a pivotal connection between them, and a steering mechanism on the fore-car for steering the vehicle, in combination with a motion-checking device for automatically preventing the rear-car from causing skidding on the fore-car, and a mechanism for connecting the said device to the rear-car which comprises a lever pivoted to the fore-car at a point at the rear of the pivotal connection between the cars and extending forward of the pivotal connection, a link connecting the front end of the lever to the rear-car at a point centrally in front of the pivotal connection, and a connection between the lever and checking device.

In witness whereof I have hereunto set my hand this twenty-first day of September, 1905.

ARTHUR PRZYGODE.

Witnesses:
 JULIUS GRÜNLAND,
 ALFRED WOLF.